United States Patent Office 3,156,552
Patented Nov. 10, 1964

3,156,552
METHOD FOR THE MODIFICATION OF THE GROWTH AND CONTROL OF UNDESIRED VEGETATION
Melvin J. Josephs, Philadelphia, Pa., assignor to The Dow Chemical Company, Midland, Mich., a corporation of Delaware
No Drawing. Filed July 16, 1962, Ser. No. 210,207
7 Claims. (Cl. 71—2.5)

This invention relates to the modification of the growth characteristics of plants and to herbicides and is particularly directed to a composition and method for the suppression of the growth of germinant seeds and undesired vegetation and for modifying the growth characteristics of plants.

In recent years, the use of chemical materials for the control of the growth of vegetation has found widespread acceptance among agriculturists. Some of the materials, known as post-emergence herbicides, are effective when sprayed as liquid compositions on established vegetation. Others, known as pre-emergence herbicides, are useful when dispersed in soil to control the growth of germinant seeds and emerging seedlings. Many of these herbicides selectively control only certain types of vegetation. However, no chemical materials have been available to the agriculturist for increasing certain plant constituents such as the sugar content of crop plants.

It is an object of the present invention to provide a new method for modifying and altering the growth characteristics of plants. Another object is the provision of a new method for the suppression and control of the growth of undesired vegetation. A further object is to provide a method for the control of the growth of germinant seeds, emerging seedlings and established vegetation. Yet another object is the provision of a new method for promoting the maturing of crops. A further object is the provision of a method for increasing the sugar content of plants and particularly of crop plants such as corn, sugar cane and sugar beets. An additional object is the provision of novel compositions to be employed for the accomplishment of the new method of growth modification and control. Other objects will become apparent from the following specification and claims.

According to the present invention, it has been discovered that the growth characteristics of plants can be modified and altered by exposing plants and plant parts to the action of a growth-altering amount of one or more compounds selected from the group consisting of tris(1-aziridinyl)phosphine oxide, tris (1-aziridinyl)phosphine sulfide, tris(2-methyl-1-aziridinyl)phosphine oxide, tris(2-methyl-1-aziridinyl)phosphine sulfide and an O-lower alkyl bis(aziridinyl)phosphine oxide. In the present specification and claims, the expression "lower alkyl" is employed to refer to radicals containing not in excess of 4 carbon atoms. More particularly, it has been discovered that the growth of germinant seeds, seedlings and established vegetation can be suppressed and inhibited by exposing the seeds, emerging seedlings or the roots or above-ground portions of established plants to the action of a growth inhibiting amount of one or more of the phosphine compounds. It has been discovered further that with proper control of dosage of the phosphine compounds, the maturing of many crop plants may be facilitated and the sugar content of many crop plants and plant parts be increased without substantial injury to that portion of the plant to be harvested. Thus, they are adapted to be employed for increasing the sugar content of such desirable crops as sugar cane and sugar beets.

The compounds are liquid or crystalline solid materials which are somewhat soluble in many common organic solvents such as alcohol, acetone, kerosene and water. By virtue of such properties, the phosphine compounds are readily incorporated in conventional liquid adjuvants. Such compositions are economically stored or transported. In turn, the ultimate user can employ the liquid compositions with or without dilution to alter or modify the growth characteristics of crop plants or to inhibit the growth of germinant seeds, emerging seedlings and growing plants. Similarly, the active phosphine compounds are readily adapted for use in dust compositions to comparable advantage.

The exposure of plants and plant parts, or of a viable form of plants, to the action of a growth altering amount of the phosphine compounds is essential and critical for the practice of the present invention. The exact dosage to be employed is dependent upon the response desired in the plant as well as such other factors as the plant species and stage of growth thereof, the soil type and depth at which the compounds are distributed in the soil and the amount of rainfall. In foliar treatments for the control and inhibition of vegetative growth, good results are obtained when one or more pounds of the phosphine compounds are applied per acre. In applications to soil for the control of the growth of germinant seeds, emerging seedlings and established vegetation, good results are obtained when the phosphine compounds are distributed in the soil at a concentration of at least one part by weight of active agent per million parts by weight of soil. In such applications, it is desirable that the compounds be distributed to a depth of at least 0.3 inch and preferably at a dosage of at least 0.3 pound per acre inch per acre. In applications for facilitating the maturing of the crop and for increasing the sugar content of crop plants, good results are obtained when the compounds are employed at dosages of at least 0.1 pound per acre.

The method of the present invention can be carried out by distributing the unmodified phosphine compounds in growth media or upon the surfaces of the above-ground portion of plants. The present method also embraces the employment of liquid or dust compositions containing the toxicants. In such usages, the toxicant compounds may be modified with one or a plurality of additaments or herbicide adjuvants including water or other liquid carriers, surface active dispersing agents and finely divided solids. Depending upon the concentration of toxicant, such augmented compositions are adapted to be distributed in soil or upon the above-ground surfaces of plants, or to be employed as concentrates and subsequently diluted with additional inert carrier to produce the ultimate treating compositions. In compositions where the adjuvant or helper is a finely divided solid, a surface active agent or the combination of a surface active agent and a liquid additament, the adjuvant cooperates with the active component so as to facilitate the invention and obtain an improved and outstanding result.

The exact concentration of the phosphine compounds to be employed in the treating compositions is not critical and may vary considerably provided the required dosage of effective agent is supplied in the growth medium or upon the plant foliage. The concentration of toxicant in liquid compositions employed to supply the desired dosage generally is from about 0.001 to 50 percent by weight, although concentrations as low as 0.0001 percent and as high as 90 percent by weight are sometimes advantageously employed. In dusts, the concentration of toxicant is from about 0.1 to 90 percent by weight and usually not in excess of about 20 percent. In both liquid and dust compositions to be employed as concentrates, the toxicants can be present in a concentration of from 5 to 98 percent by weight.

The quantity of treating compositions to be applied can vary considerably provided that the required dosage of active ingredient is applied in a sufficient amount of the finished composition to cover adequately the vegetation to be treated or to facilitate the penetration and distribution of said ingredient in growth media. The required amount of the active ingredient in the soil conveniently can be supplied per acre treated in from 10 to 27,000 gallons or more of the liquid carrier or in from 50 to 2,000 pounds of the solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above-ground portion of the vegetation. In the application of dusts to plant foliage, good results are obtained with from 40 to 2000 pounds of finished dust per acre, the only requirement being that the required toxicant dosage be supplied in sufficient dust to achieve good coverage of the foliage.

Liquid compositions containing the desired amount of active ingredient can be prepared by dispersing the toxicants in water or in organic liquid, with or without the aid of a suitable surface active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the latter, the petroleum distillates boiling almost entirely under 400° F. at atmospheric pressure and having a flash point about 80° F. are generally preferred. The organic liquid compositions can contain a small amount of water as a solvent for the toxicant ingredient. In such compositions, the carrier comprises an oil emulsion, namely, a mixture of water, emulsifying agent and organic liquid. In the liquid compositions, the choice of dispersing and emulsifying agent and the amount thereof employed is dictated by the nature of the composition and by the ability of the agent to facilitate the dispersion of the toxicant compounds in the carrier to produce the desired composition or to facilitate the wetting of surfaces upon which the compositions are applied. Dispersing and emulsifying agents which can be employed in the compositions include the condensation products of alkylene oxides with phenols and organic acids, alkyl aryl sulfonates, polyoxyalkylene derivatives of sorbitan esters, complex ether alcohols, mahogany soaps and the like.

In the preparation of dust compositions, the active ingredient is dispersed in and on a finely divided solid such as clay, talc, chalk, gypsum and the like. In such operations, the finely divided carrier is mechanically mixed or ground with the phosphine compounds. Similarly, dust compositions containing the toxicant compounds can be prepared from various of the solid surface-active dispersing agents such as bentonite, fuller's earth, attapulgite and other clays. Depending upon the proportion of ingredients, these dust compositions can be employed as concentrates and subsequently diluted with additional solid surface-active dispersing agent or with chalk, talc or gypsum and the like to obtain the desired amount of active ingredient in a composition adapted to be employed for the modification of the growth of plants. Also, such dust compositions can be dispersed in water, with or without the aid of a dispersing agent, to form spray mixtures.

When operating in accordance with the present invention, growth-altering amounts of the phosphine compounds are dispersed in soil or growth media in any convenient fashion. Applications to growth media can be carried out by simply mixing with the media, by applying to the surface of soil and thereafter dragging or discing into the soil to the desired depth, or by employing a liquid carrier to accomplish the penetration and impregnation. The application of spray and dust compositions to the surface of soil or to the above-ground surfaces of plants can be carried out by conventional methods, e.g., power dusters, boom and hand sprayers and spray dusters.

In a further method, the distribution of the phosphine compounds in soil can be accomplished by introducing the toxicants in the water employed to irrigate the soil. In such procedures, the amount of water can be varied with the porosity and water-holding capacity of the soil to obtain the desired depth of distribution of the toxicants.

The following examples illustrate the invention but are not to be construed as limiting.

*Example 1*

Tris(1 - aziridinyl)phosphine oxide, tris(1 - aziridinyl) phosphine sulfide, tris(2-methyl-1-aziridinyl)phosphine oxide, tris(2-methyl-1-aziridinyl)phosphine sulfide, O-methyl bis(1-aziridinyl)phosphine oxide and O-butyl bis(1 - aziridinyl)phosphine oxide are each separately mixed with an alkylated aryl polyether alcohol (Triton X–100) to prepare water-dispersible concentrate compositions. In such operations, 25 parts by weight of a phosphine oxide compound is employed with 4 parts by weight of Triton X–100.

In a further operation, 25 parts by weight of tris(1-aziridinyl)phosphine oxide, 70 parts of fuller's earth, 3 parts of an alkyl aryl sulfonate (Nacconol NR) and 2 parts of a polymerized sodium salt of substituted benzoid alkyl sulfonic acid (Daxad No. 27) are mechanically mixed and ground together to prepare a concentrate composition in the form of a wettable powder. In exactly similar operations, concentrate compositions are prepared from tris(1-aziridinyl)phosphine sulfide, tris(2-methyl-1-aziridinyl)phosphine oxide, tris(2-methyl - 1 - aziridinyl) phosphine sulfide, O-ethyl bis(1-aziridinyl)phosphine oxide and O-isopropyl bis(1-aziridinyl)phosphine oxide. These concentrate compositions are adapted to be dispersed in water to prepare aqueous compositions which have very desirable wetting and penetrating properties. The latter aqueous compositions are adapted to be employed to distribute the phosphine compounds in soil or upon the above-ground surfaces of plants in growth-altering or growth-inhibiting dosages.

*Example 2*

A portion of the wettable powder containing tris (1-aziridinyl)phosphine oxide as described in Example 1 is dispersed in water to prepare an aqueous composition containing 0.172 pound of tris(1-aziridinyl)phosphine oxide per 100 gallons of ultimate mixture. This aqueous composition is employed for the treatment of soil areas of sandy loam soil of good nutrient content. In such operations, the composition is applied to the soil areas as a soil drench and at a rate of 0.434 acre-inch of aqueous composition per acre to apply a substantially uniform dosage of 20 pounds of the tris(1-aziridinyl)phosphine oxide per acre. This dosage corresponds to a concentration of about 32 parts by weight of soil. Immediately prior to the applications, the soil areas are prepared and seeded to Japanese millet, wild oats, crab grass, Sudan grass and meadow fescue. Other areas similarly prepared and seeded to the named plant species are left untreated to serve as checks. After three weeks, the treated areas are examined to ascertain what control of the growth of seeds and emerging seedlings has been obtained. As a result of the examination, there is found a 99 percent kill of Japanese millet and wild oats, a 95 percent kill of crab grass and Sudan grass and a 100 percent kill of meadow fescue. At the time of the observation, the check areas are found to support luxuriant and vigorously-growing stands of the named plant species.

A portion of the wettable powder containing tris(1-aziridinyl)phosphine sulfide as described in Example 1 is dispersed in water to prepare an aqueous composition containing 0.172 pound of the phosphine sulfide compound per 100 gallons of ultimate mixture and this composition employed exactly as described in the foregoing paragraph as an aqueous drench for the treatment of seed beds at a substantially uniform dosage of 20 pounds of the phosphine sulfide compound per acre. Immediately prior to the applications, the soil areas are seeded to pigweed, marigold, German millet, wild oats, Sudan grass and meadow fescue. After three weeks, the treated and check seed beds are examined to ascertain what control of the growth of seeds and emerging seedlings has been obtained. As a result of the examination, there is found a 90 percent kill of pigweed and German millet, an 80 percent kill of marigold, wild oats and Sudan grass and a 100 percent kill of meadow fescue. At the time of these observations, the check seed beds are found to support copious and rapidly-growing stands of the named plant species.

*Example 3*

A portion of the wettable powder containing tris(1-aziridinyl)phosphine oxide as described in Example 1 is dispersed in water to prepare an aqueous composition containing 0.43 pound of the phosphine oxide compound per 100 gallons of ultimate mixture. This aqueous composition is employed to treat sandy loam soil of good nutrient content which has been planted with the seeds of Japanese millet, wild oats and German millet. In such operations, the composition is applied to the soil areas as a soil drench and at a rate of 0.434 acre-inch of aqueous composition per acre to supply a substantially uniform dosage of 50 pounds of the tris(1-aziridinyl) phosphine oxide per acre. This dosage corresponds to a concentration of about 80 parts by weight of the phosphine oxide compound per million parts by weight of soil. Other areas similarly planted with the named plant species are left untreated to serve as checks. After three weeks, the treated areas are examined to ascertain what control of the growth of the seeds and emerging seedlings has been obtained. As a result of the examination, there is found a 100 percent kill of the Japanese millet, wild oats and German millet. At the time of the observation, abundant stands of the named plant species are found in the check areas.

In an exactly analogous operation, a portion of the wettable powder concentrate containing O-ethyl bis(1-aziridinyl)phosphine oxide as described in Example 1 is dispersed in water to prepare an aqueous composition containing 0.172 pound of the phosphine oxide compound per 100 gallons of ultimate mixture. This composition is employed in the manner as described in the foregoing paragraph to treat sandy loam soil which has been planted with the seeds of German millet and wild oats. In such operations, the composition is applied to the soil areas as a soil drench and at a rate of 0.434 acre inch of aqueous composition per acre to supply a substantially uniform dosage of 50 pounds of the phosphine oxide compound per acre. This dosage corresponds to a concentration of about 80 parts by weight of the phosphine oxide compound per million parts by weight of soil. After three weeks, the treated areas and check areas are examined to ascertain what control of the growth of seeds and emerging seedlings has been obtained. As a result of the examination, there is found a 100 percent control of German millet and a 95 percent control of wild oats in the treated areas. At the time of the observations, vigorously-growing and copious stands of the named plant species are found in the check areas.

*Example 4*

The wettable powder of Example 1 is dispersed in water to prepare an aqueous composition containing 0.0172 pound of tris(1-aziridinyl)phosphine oxide per 100 gallons of ultimate mixture. This aqueous composition is employed for the treatment of sandy loam soil of good nutrient content which has been planted with seeds of meadow fescue. In such operation, the composition is applied to the soil as a soil drench and at a rate of 0.434 acre-inch of aqueous composition per acre to supply a substantially uniform dosage of two pounds of the phosphine oxide compound per acre. This dosage corresponds to a concentration of about 3.2 parts by weight of the phosphine oxide compound per million parts by weight of soil. Another area similarly prepared and seeded is left untreated to serve as a check. After three weeks, the treated area is examined and found to show a 90 percent kill of the meadow fescue. At the time of the observation, the check area is found to support a luxuriant and vigorously-growing stand of meadow fescue.

*Example 5*

Tris(1-aziridinyl)phosphine oxide is dissolved in water to prepare aqueous spray compositions containing 5,000 parts and 10,000 parts by weight of the phosphine oxide compound per million parts by weight of ultimate solution. Tris(2-methyl-1-aziridinyl)phosphine oxide is similarly dissolved in water to prepare an aqueous spray composition containing 5,000 and 10,000 parts by weight of the phosphine oxide compound per million parts by weight of ultimate mixture. An amount of Triton X–100 equal to 0.3 gram per liter of spray solution is added to each of the above-prepared spray mixtures, and portions of the resulting compositions thereafter applied to the foliage of seedling stands of German millet which are from two to four inches tall. In the treating operations, the compositions are applied with conventional spray equipment at 40 pounds per square inch and at a dosage of 40 gallons per acre. Other similar stands of German millet are left untreated to serve as checks. About two weeks following the applications, the treated stands are examined to ascertain the percent control of growth. As a result of these operations, there is found a 100 percent kill of the stands treated with both concentrations of the tris(1-aziridinyl)phosphine oxide compounds. In the stands treated with the tris(2-methyl-1-aziridinyl)phosphine oxide compound, there is found a 95 percent kill of German millet in the stand treated with the composition containing 10,000 parts per million by weight and a 90 percent kill of millet in the stand treated with the composition containing 5,000 parts per million by weight of toxicant. At the time of the examination, there is found luxuriant and vigorously growing stands of German millet in the untreated checks.

*Example 6*

Tris(1-aziridinyl)phosphine oxide is dissolved in water to prepare aqueous spray compositions containing 2,000 parts and 10,000 parts by weight of the phosphine oxide compound per million parts by weight of ultimate mixture. Similarly, O-ethyl bis(1-aziridinyl)-phosphine oxide is dissolved in water to prepare aqueous spray compositions containing 2,000 parts and 10,000 parts by weight of the oxide compound per million parts by weight of ultimate solution. An amount of Triton X–100 equal to 0.3 gram per liter of spray solution is added to the spray mixtures as above prepared and portions of the resulting compositions thereafter applied to the foilage of seedling stands of pinto beans which are from two to four inches tall. In the treating operations, the compositions are applied with conventional spray equipment at 40 pounds per square inch and at a dosage of 40 gallons per acre. Other similar and adjacent stands of pinto beans are left untreated to serve as checks. About two weeks following the applications, the treated stands are examined and there is found an 80 percent kill of the stand receiving the 2,000 parts application and a 98 percent kill of the stand receiving the 10,000 parts application of the composition containing tris(1-aziridinyl)phosphine oxide. In the stands treated with the composition containing O-ethyl bis(1-aziridinyl)phosphine oxide, there is found a 90 percent kill of bean plants in the stand receiving the 2,000 parts application and a 98 percent kill in the stand receiving the 10,000 parts application. At the time of the observations, there is found luxuriant and vigorously-growing stands of pinto beans in the untreated checks.

In an exactly analogous operation, tris(1-aziridinyl) phosphine sulfide is dispersed in water to prepare an aqueous composition containing 5,000 parts per million by weight of the phosphine sulfide compound and the resulting composition applied to stands of pinto bean plants. About two weeks following the applications, the stands are examined and an 80 percent kill of bean plants observed. At the time of such observations, copious and rapidly-growing stands of pinto beans are found in the untreated check areas.

*Example 7*

An ethanol solution containing 70 percent by weight of tris(1-aziridinyl)phosphine oxide is dispersed in water to prepare an aqueous composition containing 5,000 parts by weight of the oxide compounds per million parts by weight of ultimate mixture. Also, tris(2-methyl-1-aziridinyl)phosphine oxide and O-ethyl bis(1-aziridinyl) phosphine oxide are dispersed in water to prepare an aqueous composition containing 2,000 parts per million by weight of one of the oxide compounds, and an amount of Triton X–100 equal to 0.3 gram per liter subsequently added to each composition. These aqueous compositions are applied to the foliage of seedling stands of corn which are about four inches tall. In the treating operations, the compositions are applied with conventional spray equipment at 40 pounds per square inch and at a dosage of about 40 gallons per acre. Other similar and adjacent stands of seedling corn are left untreated to serve as checks.

About two weeks following the applications, the stands of corn are harvested at the ground line and chemical analyses carried out to determine the sucrose sugar content of the plants. The results of the determinations in grams of sucrose sugar per thousand plants are set forth in the following table.

| Test Compound | Concentration of Test Compound in Spray Mixture | Grams of Sucrose Sugar Per 1,000 Corn Plants |
|---|---|---|
| Tris(1-aziridinyl)-phosphine oxide | 5,000 | 71 |
| O-Ethyl bis(1-aziridinyl)-phosphine oxide | 5,000 | 35 |
| Tris(2-methyl-1-aziridinyl)phosphine oxide | 2,000 | 70 |
| Untreated check stands | 0 | 21 |

*Example 8*

An ethanol solution containing 70 percent by weight of tris(1-aziridinyl)phosphine oxide is dispersed in water to prepare an aqueous spray composition containing 1,000 parts per million by weight of the phosphine oxide compound. Also, tris(2-methyl-1-aziridinyl)phosphine oxide is dispersed in water to prepare an aqueous spray composition containing 1,000 parts per million by weight of the oxide compound. An amount of Triton X-100 equal to 0.3 gram per liter of spray solution is added to the aqueous composition containing tris(2-methyl-1-aziridinyl)phosphine oxide and this spray composition and the spray composition containing tris(1-aziridinyl)phosphine oxide thereafter applied to the foliage of seedling stands of Sudan grass which are from two to six inches tall. In the treating operations, the compositions are applied with conventional spray equipment at 40 pounds per acre inch and in an amount of about 40 gallons per acre. Other adjacent and similar stands of Sudan grass are left untreated to serve as checks.

Subsequently, the stands are harvested at the ground line and chemical analyses carried out to determine the percent content of sucrose sugar. The time of harvest and results of the evaluations expressed as grams of sucrose sugar per thousand plants are set forth in the following table.

| Test Compound | Time of Harvest Expressed as Weeks Following Initial Application | Grams of Sucrose Sugar Per 1,000 Plants |
|---|---|---|
| Tris(1-aziridinyl)-phosphine oxide | 2 | 1.3 |
| Untreated check | 2 | 0.3 |
| Tris(2-methyl-1-aziridinyl)phosphine oxide | 3 | 4.24 |
| Untreated check | 3 | 2.01 |

The term "plant part" as employed in the present specification and claims is intended to be inclusive of the stems, branches, roots, foliage and germinant seeds of plants.

The expressions "growth media" and "soil" are herein employed in their broadest sense to be inclusive of all conventional "soils" as defined in Webster's New International Dictionary, second edition, unabridged, published in 1937 by G. and C. Merriam Company, Springfield, Mass. Thus, the terms refer to any substance or media in which vegetation may take root and grow, and are intended to include not only earth but compost, manure, muck, humus, sand and the like, adapted to support plant growth.

The compounds, as employed in accordance with the teachings of the present invention, are prepared in known procedures. Thus, the tris(1-aziridinyl)- and tris(2-methyl-1-aziridinyl)phosphine oxides as well as the corresponding sulfides are prepared by reacting ethyleneimine or propyleneimine with phosphorus oxychloride or phosphorus thiochloride. Similarly, the O-lower alkyl bis(1-aziridinyl)phosphine oxides are prepared by reacting ethyleneimine with a suitable O-lower alkyl phosphorodichloridate. The reaction is carried out in the presence of a tertiary amine such as triethylamine and when employing stoichiometric amounts of the reagents. Good results are obtained when operating at temperatures of from about −10° to 40° C. Following the reaction, the desired products are separated by conventional procedures.

This application is a continuation-in-part of my co-pending application Serial No. 79,965, filed January 3, 1961, now abandoned.

What is claimed is:

1. A method which comprises exposing plants and plant parts to the action of a growth-altering amount of an active agent selected from the group consisting of tris(1-aziridinyl)phosphine oxide, tris(1-aziridinyl) phosphine sulfide, tris(2-methyl-1-aziridinyl)phosphine oxide, tris(2-methyl-1-aziridinyl)phosphine sulfide and an O-lower alkyl bis(aziridinyl)phosphine oxide.

2. An agronomical practice which comprises impregnating soil with a growth-altering amount of an active agent selected from the group consisting of tris(1-aziridinyl)phosphine oxide, tris(1-aziridinyl)phosphine sulfide, tris(2-methyl-1-aziridinyl)phosphine oxide, tris(2-methyl-1-aziridinyl)phosphine sulfide and an O-lower alkyl bis(aziridinyl)phosphine oxide.

3. A method which comprises applying to growing plants and plant parts a growth-altering amount of a composition comprising an active agent in admixture with a herbicide adjuvant as a carrier therefor, the active agent being a compound selected from the group consisting of tris(1-aziridinyl)phosphine oxide, tris(1-aziridinyl)phosphine sulfide, tris(2-methyl-1-aziridinyl)phosphine oxide, tris(2-methyl-1-aziridinyl)phosphine sulfide and an O-lower alkyl bis(aziridinyl)phosphine oxide.

4. A method claimed in claim 1 wherein the active agent is tris(1-aziridinyl)phosphine oxide.

5. A method claimed in claim 1 wherein the active agent is tris(2-methyl-1-aziridinyl)phosphine oxide.

6. A method claimed in claim 1 wherein the active agent is O-ethyl bis(1-aziridinyl)phosphine oxide.

7. A method claimed in claim 1 wherein the active agent is tris(1-aziridinyl)phosphine sulfide.

References Cited in the file of this patent

Jackson et al.: British J. Pharmacol, 14, pages 149 to 157 (pages 149 and 150 particularly relied upon), 1959.

Brecque et al.: J. of Economic Entomology, vol. 54, No. 4, pages 684 to 689 (page 685 particularly relied upon), 1961.

Wright et al.: Comparative Clinical and Biological Effects of Alkylating Agents, vol. 68, Art 3, pages 937 to 940.